United States Patent Office 3,108,367
Patented Oct. 29, 1963

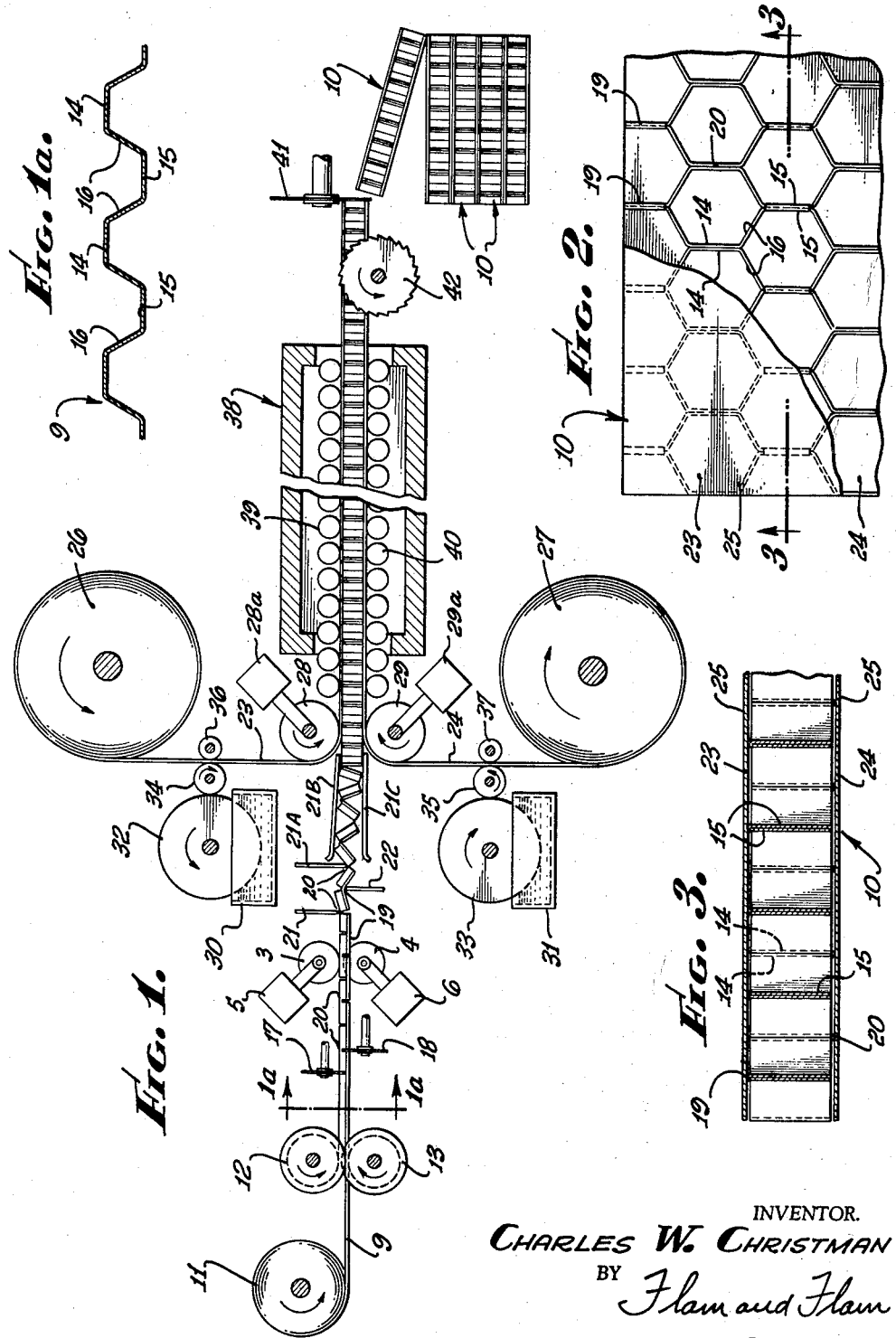

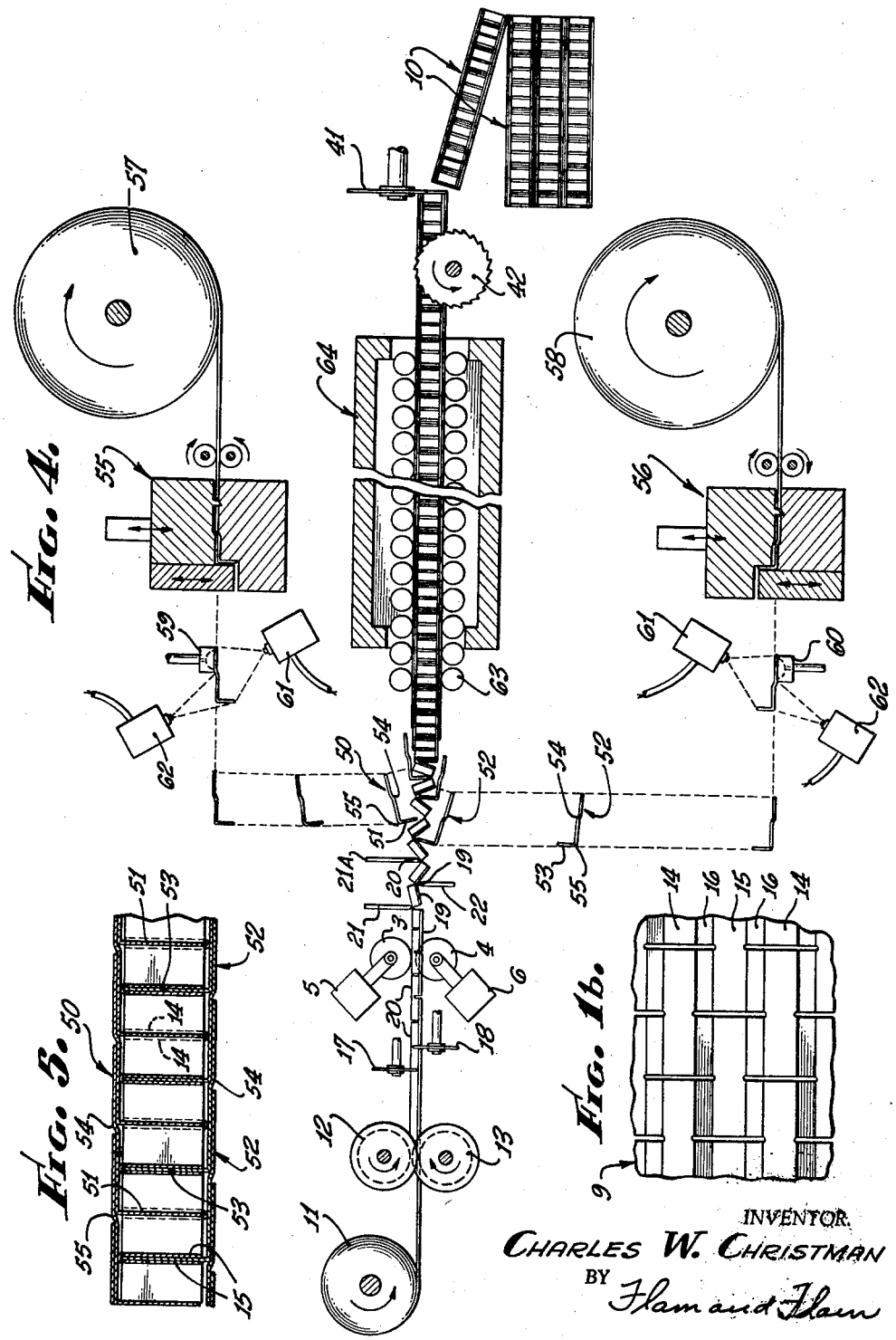

3,108,367
CONTINUOUS METHOD OF MANUFACTURING CELLULAR CORED PANELS
Charles W. Christman, Los Angeles, Calif., assignor to Formacel, Inc., Los Angeles, Calif., a corporation of California
Filed Apr. 6, 1959, Ser. No. 804,160
3 Claims. (Cl. 29—430)

This invention relates to cellular cored panels, and particularly to mechanized and continuous processes for manufacture thereof.

Cellular core material has in the past been produced by securing together fluted or sinuous straps, adjacent strips having opposite orientations so that, instead of a nested relationship, spaced cells are formed between each pair of strips. Sheet covering material is subsequently secured to opposite sides of the cellular material to provide an enclosure. Such material may be used, for example, in airplane sections. Column-type reinforcement is thus achieved with minimum weight.

In my copending application, Serial No. 655,760, filed April 29, 1957 now Patent Number 2,933,122, and entitled Cellular Core Material, and Method of Making Same, there is disclosed a continuous step process for manufacturing the cellular material by accordion bending of generally sinuous material. An object of this invention is to incorporate in a continuous process novel means for applying covering material to cellular core so manufactured.

This application is a continuation-in-part of my application Serial No. 723,372, filed March 24, 1958, now Patent Number 3,017,971, and entitled Cellular Cored Panels and Continuous Process for Manufacturing Same.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic view illustrating a continuous step process comprising one form of this invention;

FIG. 1a is a sectional view, taken along a plane indicated by line 1a—1a of FIG. 1;

FIG. 1b is a plan view showing the cuts in the sinuous material;

FIG. 2 is an enlarged plan view illustrating the cellular core material constructed in accordance with the process diagrammatized in FIG. 1, a portion of the enclosing or covering material being broken away for purposes of clarity;

FIG. 3 is a sectional view, taken along a plane indicated by line 3—3 of FIG. 2;

FIG. 4 diagrammatically illustrates another continuous process for making cored panels; and FIG. 5 is a view similar to FIG. 3, but illustrating a transverse section of the cored panels made in accordance with the process diagrammatized in FIG. 4.

Referring to FIGS. 1, 2 and 3, the apparatus illustrated in FIG. 1 produces cored panels 10. Material 9 from a feed roll 11 at the left-hand portion of FIG. 1 passes between forming rollers 12 and 13. The forming rollers provide a uniformly fluted or sinuous transverse configuration to the material 9, as illustrated clearly in FIG. 1a. Alternate crests 14 and troughs 15 are formed which are joined to each other by side walls 16.

The crests 14, troughs 15 and side walls 16 are, in the present instance, each of uniform width, and the side walls 16 extend at angles of 120° to both the crests 14 and the troughs 15. Thus, a trough and the two side wall sections 16 adjacent thereto can form the lower part of a hexagonal cell element; and a crest and its two adjacent side walls 16 can form the upper half of an interfitting hexagonal cell element, when the sinuous material is folded or bent in a manner to be described. Other configurations can be provided, the hexagonal arrangement being merely an example.

The material 9, after leaving the forming rollers 12 and 13, is transversely cut, as by cutters 17 and 18. The upper cutter 17 slits all of the side walls 16 and the crests 14, leaving only the troughs 15 intact. There is thus produced an axis 19 at the troughs 15 of low bending resistance for localizing the bending action. The lower cutter 18 is spaced longitudinally from the upper cutter 17. It slits the troughs 15 and all of the side wall sections 16, leaving only the crests 14 intact. There is thus provided another axis 20 falling along the crests 14 about which the material can be readily bent. The configuration produced by the cutters is illustrated in FIG. 1b. The material is intermittently advanced twice the spacing between the cutters 17 and 18, and the cutting operation is repeated. There are thus produced interspaced sets of bending axes 19 and 20.

Three bending dies 21, 21A and 22, illustrated in FIG. 1, initiate the accordion folding of the material.

The bending die 22 moves upwardly or transversely of the material at one trough axis 19 while the material is restrained at the adjacent crest axes 20. The two troughs on opposite sides of the bending die 22 are caused to fold toward each other. Crest sets at the dies 21, 21A, etc. likewise fold. The bending axes 19 and 20 are thus transposed on opposite sides of the material.

Of course, the die 22 may be stationary and the dies 21 and 21A movable; or both may move.

To control the feed of material to the bending dies, use is made of two rollers 3 and 4 and respectively located on opposite sides of the material 9 immediately in advance of the bending dies 21, 21A and 22. Devices 5 and 6 control the rollers 3 and 4 to ensure appropriate alignment of the cuts with the dies before the material stops at the bending stage.

While the dies might be used substantially to complete the folding, certain complications are avoided and advantageous simplifications are achieved by completing the folding in another manner.

One complication is that if the crests and troughs are to be placed in back-to-back relationship, either the adjacent dies 21 and 21A must move toward each other as the material shrinks longitudinally or the material must be substantially elongated after it is initially compressed to a minor degree. Both undesirable alternations are avoided by moving the dies only to an extent such that one axis 19 passes from one side to the other of a line joining the adjacent axes 20. In this instance, the distance longitudinally of the material between the axes 20 and the axis 19 readily stays constant as long as the cell height substantially exceeds the cell width. In this case, the material is insignificantly compressed. By appropriately controlling the ratio of cell height to cell width, this compression can be confined to the elastic range. The stresses accordingly are relieved as soon as the dies move beyond aligned relationship.

Longitudinal pressure is now capable of completing the accordion folding. To ensure completion of the folding, the material must be proportionately retarded after bending by a factor equal to half the ratio of cell width to cell height since, from a longitudinal viewpoint, one cell width results from two cell heights.

Rollers 28 and 29 provide the appropriate retarding action. Upon indexing of the material, the rollers 28 and 29 permit advancement of the material a distance corresponding only to the width of the cell. Control devices 28A and 29A ensure this operation. The feed rollers 3 and 4 operate faster than the rollers 28 and 29; hence, the folding is completed by longitudinal pressure.

Between the rollers 28 and 29 and the bending dies 21, 21A and 22 is a guide structure comprising plates 21B and 21C. The plates converge toward each other in the direction corresponding to longitudinal advancement of the material, and the spacing at this end corresponds to the cell height. The divergence of the plates 21B and 21C is sufficient to allow for the 90° rotation of the cell parts. The guides 21B and 21C serve to maintain uniform lateral orientation of the cell parts and furthermore ensure that the cell parts are prevented from bowing outwardly in response to longitudinal pressure.

The rollers 28 and 29 also apply covering materials 23 and 24 to opposite sides of the cell core, whereby top and bottom enclosing plates 25 (FIG. 3) are provided.

The bending die 22 and others operating at the axes 19 cause adjacent troughs to be placed in engagement, as designated at 15—15 in FIG. 2. It will thus be appreciated that a cellular core is continuously produced by the forming rollers, cutters and bending dies.

The covering material 23 is applied to the top of the cells and the material 24 to the bottom as the cells progress to the right, as viewed in FIG. 1. Materials 23 and 24 are supplied from supply rollers 26 and 27 located above and below the line of progress of the cell material. The rollers 28 and 29, about which the materials 23 and 24 respectively pass, appropriately guide the material for tangent appliction along the upper and lower planes of the cells.

In order to secure the covering material 23, for example, to the cell material 9, brazing processes may be used. In this case, the covering materials 23 and 24 and the cell material are made of material suitable for brazing. Brazing flux is applied to the covering materials 23 and 24. A pump, in the form of a roller 32, lifts metered quantities of fluid flux from a container 30. A transfer roller 34, engaging the pump roller 32 and one side of the covering material 23, applies a thin coating of flux. A backing roller 36, on that side of the material 23 opposite the transfer roller, holds the material 23 in position. A pump roller 33, container 31, transfer roller 35 and backing roller 37 are provided for the material 24.

The covered cells pass into a brazing oven 38. Several sets of pressure rollers 39 and 40 on opposite sides of the cell core material hold the covering materials 23 and 24 firmly into engagement with edges at the top and bottom surfaces of the cell material in the oven 38. The oven 38 is shown as of indefinite length; its dimensions are suited to the travel of the material through it; and it may be heated to an appropriate temperature either electrically or by aid of gaseous or liquid fuel.

The process illustrated may also be used to cement the materials together by means of a thermosetting or catalyzed bonding agent. In this case, the containers hold a thermosetting or catalyzed bonding agent, and the temperature of the oven 38 is adjusted for appropriate curing.

As the material exits the oven 38, the units 10 are cut to the desired size. A rotary cutter or saw 41, operable, for example, once every eight steps of advancement of the material 9, cuts the panels 10 to length, and continuously operable rotary cutters 42 determine the width of the panels. The rotary cutters 42 may be used for purposes of trimming the side edges of the material, the width of the panels 10 being controlled, at least generally, by the width of the material at the supply roller 11 and by the forming rollers 12 and 13.

The process illustrated may be modified to facilitate securing of the members by welding processes. In this instance, welding equipment will be substituted for the curing or brazing oven 38.

In FIG. 4, an alternate method is provided for applying covering material for the cell structure. The cell material, apart from its covering, is made in the same manner as illustrated in FIG. 1. Thus, there are provided a supply roller 11, forming rollers 12 and 13, cutters 17 and 18, and bending dies 21 and 22.

Angled plates 50 have flanges 51 at one end that are inserted between the crests 14 that would otherwise directly engage each other by bending about the axes 20; and similar angled plates 52 have flanges 53 received between the troughs 15 that would otherwise be placed in engagement with each other by bending about the axes 19. The plates 50 and 52 extend forwardly relative to the progress of the cell material and overlap the plates inserted between the preceding crests or troughs.

To ensure intimate engagement between the plates at the edges of the cell material where there is no overlap, an intermediate offset 54 is provided corresponding to the thickness of the plates themselves. The offset 54 is located from the bend 55 forming the flange 51 at a distance corresponding to the cell dimension, which dimension corresponds to the spacing between insertion positions of adjacent plates 50 (see FIG. 5).

The plates 50 and 52 are formed by bending and cutting dies 55 and 56 supplied from rolls of material 57 and 58. The dies 55 and 56 each operates to produce one plate for each advancement step of the cell material.

In order firmly to affix the plates 50 and 52 to the cell material, appropriate bonding material or brazing flux is applied to the plates in advance of their insertion between the cell elements. Vacuum cup holders 59 and 60 respectively for the plates 50 and 52 engage the forward outer areas of the plates. These areas correspond to the areas that will be exposed exteriorly of the panels 10.

The holders 59 and 60 from shields during application of the flux bonding material, as by spray devices 61 and 62. The spray device 61 coats the entire inner area of the plate 50 completely; and the other spray device 62 covers that outer area which will be engaged by the succeeding plate.

The holder 59 is used for carrying the plate 50 to the area of insertion between the cell elements so that interference with the flux or bonding material applied to the plates is avoided. The holders 59 and 60 receive the plates 50 and 52 from the presses of dies 55 and 56.

After the plates 50 and 52 are inserted between the cells, the covered core material passes between sets of pressure rollers 63 and into a curing or brazing oven 64. The plates in this instance provide two thicknesses of material for covering purposes. If desired, the plates may be lengthened and provided with additional offsets for increasing the thickness of the covering.

The accordion folding is, in the present instance, also completed by longitudinal force. The rollers 3—4 are also provided. But the plates 50 and 52 form a guide in place of the guide plates 21B and 21C of the previous form. Furthermore, their rate of advancement is controlled so that the rollers 28 and 29 of the previous form are not needed.

The inventor claims:

1. The continuous process of manufacturing covered cellular core material, which comprises: progressively longitudinally advancing a continuous flat metal sheet; progressively forming said sheet into a longitudinally corrugated configuration defining transversely alternating crests and troughs; progressively providing longitudinally spaced first sets of transverse cuts through the troughs of said corrugated sheet from one side thereof and progressively providing adjacent longitudinally spaced second sets of transverse cuts through the crests of said corrugated sheet from the other side thereof intermediate of said first sets of cuts in the troughs; progressively alternately bending said corrugated sheet from the sides thereof opposite to said respective first and second sets of cuts and along the axis of said first and second sets of cuts to cause said corrugated sheet to assume a sinuous form; progressively inserting between each of the alternate bends on the opposite sides of said sinuously bent corrugated sheet the transversely extending flange of a metal cell covering plate; and progressively further bending said sinuously bent corrugated sheet from the side thereof opposite to said respective first and second sets of cuts and along the axis of said first and second sets of cuts to cause adjacent troughs and crests to abut against said flange on said covering plates to capture same therebetween and form covered cellular core.

2. The process as set forth in claim 1, together with the steps of applying to the successive plates, in advance of their insertion between the bends, material for bonding of the plates to the cells; and bonding said plates in succession to the core cells by the aid of the bonding material applied to the plates after they are captured by the corrugated material.

3. The process as set forth in claim 2, together with the step of suspending and transporting successive plates for application of bonding material and for subsequent insertion between the bends by vacuum holders shielding only the areas of the plates to be exposed exteriorly of the covered cellular core material.

References Cited in the file of this patent

UNITED STATES PATENTS

| | | |
|---|---|---|
| 1,389,294 | Dean | Aug. 30, 1921 |
| 2,001,632 | Schlichting | May 14, 1935 |
| 2,423,870 | Blessing | July 15, 1947 |
| 2,722,735 | Beamish | Nov. 8, 1955 |
| 2,746,139 | Van Pappelendam | May 22, 1956 |

FOREIGN PATENTS

| | | |
|---|---|---|
| 189,297 | Great Britain | Nov. 30, 1922 |